(12) United States Patent
Isoda et al.

(10) Patent No.: US 11,881,693 B2
(45) Date of Patent: Jan. 23, 2024

(54) WIRE GUIDE DEVICE INCLUDING FIRST DIVIDED PART AND SECOND DIVIDED PART

(71) Applicant: SUMITOMO WIRING SYSTEMS, LTD., Mie (JP)

(72) Inventors: Kazuma Isoda, Mie (JP); Katsuhiko Sato, Mie (JP); Hiroki Uno, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 464 days.

(21) Appl. No.: 17/179,620

(22) Filed: Feb. 19, 2021

(65) Prior Publication Data
US 2021/0288479 A1    Sep. 16, 2021

(30) Foreign Application Priority Data

Mar. 11, 2020 (JP) ................. 2020-041733

(51) Int. Cl.
| | |
|---|---|
| *F16G 13/16* | (2006.01) |
| *H02G 3/34* | (2006.01) |
| *H02G 11/00* | (2006.01) |
| *H02G 3/04* | (2006.01) |
| *B60R 16/02* | (2006.01) |

(52) U.S. Cl.
CPC ........... *H02G 3/0456* (2013.01); *F16G 13/16* (2013.01); *H02G 3/0406* (2013.01); *H02G 3/34* (2013.01); *H02G 11/00* (2013.01); *B60R 16/0207* (2013.01)

(58) Field of Classification Search
CPC ... B60R 16/0215; B60R 16/027; F16G 13/16; H02G 3/0406; H02G 11/00; H02G 11/006; H01B 7/06
USPC ..................................... 174/72 A
See application file for complete search history.

(56) References Cited

U.S. PATENT DOCUMENTS

2019/0161034 A1* 5/2019 Isoda .................. B60R 16/0215

FOREIGN PATENT DOCUMENTS

| JP | 2007-174735 A | 7/2007 |
| JP | 2015-077052 A | 4/2015 |
| JP | 2018-207705 A | 12/2018 |

* cited by examiner

*Primary Examiner* — Timothy J Thompson
*Assistant Examiner* — Michael F McAllister
(74) *Attorney, Agent, or Firm* — Venjuris, P.C.

(57) ABSTRACT

A wire guide device includes a first divided part and a second divided part that can be combined in a width direction. In a combined state, the first divided part and the second divided part form an insertion hole 19 through which a wire passes in a direction intersecting the width direction. One end of the insertion hole is open toward a cable guide, and the other end of the insertion hole is open upward. The upper side of the insertion hole is covered by upper walls of the first divided part and the second divided part. The upper walls of the first divided part and the second divided part are formed in the width direction, are abutted against each other, and include upper guide portions that restrict displacement in a direction orthogonal to the width direction.

5 Claims, 9 Drawing Sheets

WIRE GUIDE DEVICE INCLUDING FIRST DIVIDED PART AND SECOND DIVIDED PART

CROSS-REFERENCE TO RELATED APPLICATIONS

This application is based on and claims priority from Japanese Patent Application No. 2020-041733, filed on Mar. 11, 2020, with the Japan Patent Office, the disclosure of which is incorporated herein in their entireties by reference.

TECHNICAL FIELD

The present disclosure relates to a wire guide device to be arranged at an end portion of a cable guide.

BACKGROUND

A wire guide device disclosed in Japanese Patent Laid-open Publication No. 2017-229206 is to be arranged at an end portion of a flexible cable guide. A wire insertion hole through which a wire is to be passed is provided inside the wire guide device. The wire guide device includes an upper wall arranged on the upper side, a lower wall arranged on the lower side, two side walls that are opposed to each other and connect the upper wall and the lower wall, and an end wall that rises from the end portion of the lower wall. The wire insertion hole is formed by a first divided part and a second divided part, and is divided in a circumferential direction.

The first divided part includes the upper wall and the two side walls, and is open downward and toward both sides in the width direction. The second divided part includes the lower wall and the end wall, and is open upward and toward the cable guide.

The first divided part and the second divided part include fitting structures that are configured to be slid and fitted to each other when the first divided part and the second divided part are combined. The fitting structures include first groove portions and first protruding portions that are provided at the lower end portions of the side walls of the first divided part, and second groove portions and second protruding portions that are provided at the two end portions in the width direction of the lower wall of the second divided part. The second protruding portions protrude inward from the upper ends of raised protruding portions that rise from the two end portions in the width direction of the lower wall. The first protruding portions are to be fitted into the second groove portions, and the second protruding portions are to be fitted into the first groove portions. Sliding operations (combining operations) of the first divided part and the second divided part are guided using the fitting structures mentioned above. It should be noted that the technologies related to this type of wire guide device are also disclosed in Japanese Patent Laid-open Publication Nos. 2007-174735, 2018-207705 and 2015-077052.

SUMMARY

In Japanese Patent Laid-open Publication No. 2017-229206, the lower end portions of the side walls, the first protruding portions, and the raised protruding portions are lined up in the width direction in the state in which the first divided part and the second divided part are combined (see reference numerals 15, 38, and 48 in FIG. 5 in Japanese Patent Laid-open Publication No. 2017-229206). Accordingly, there is a concern regarding the large size of the wire guide device in the width direction. This poses a problem in that, for example, when the layout for installation of the wire guide device is limited, it is difficult to employ the fitting structures mentioned above.

Accordingly, it is an object of the present disclosure to provide a wire guide device that is configured such that an increase in size in the width direction can be avoided and the installability can be improved.

A wire guide device of the present disclosure is a wire guide device to be arranged at an end portion of a cable guide, comprising a first divided part and a second divided part that can be combined in a width direction, wherein, in a combined state, the first divided part and the second divided part form an insertion hole through which a wire passes in a direction intersecting the width direction, one end of the insertion hole is open toward the cable guide, and the other end of the insertion hole is open upward, an upper side of the insertion hole is covered by upper walls of the first divided part and the second divided part, and the upper walls of the first divided part and the second divided part are formed in the width direction, are abutted against each other, and include upper guide portions that restrict displacement in a direction orthogonal to the width direction.

With the present disclosure, it is possible to provide a wire guide device that is configured such that an increase in size in the width direction can be avoided and the installability can be improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
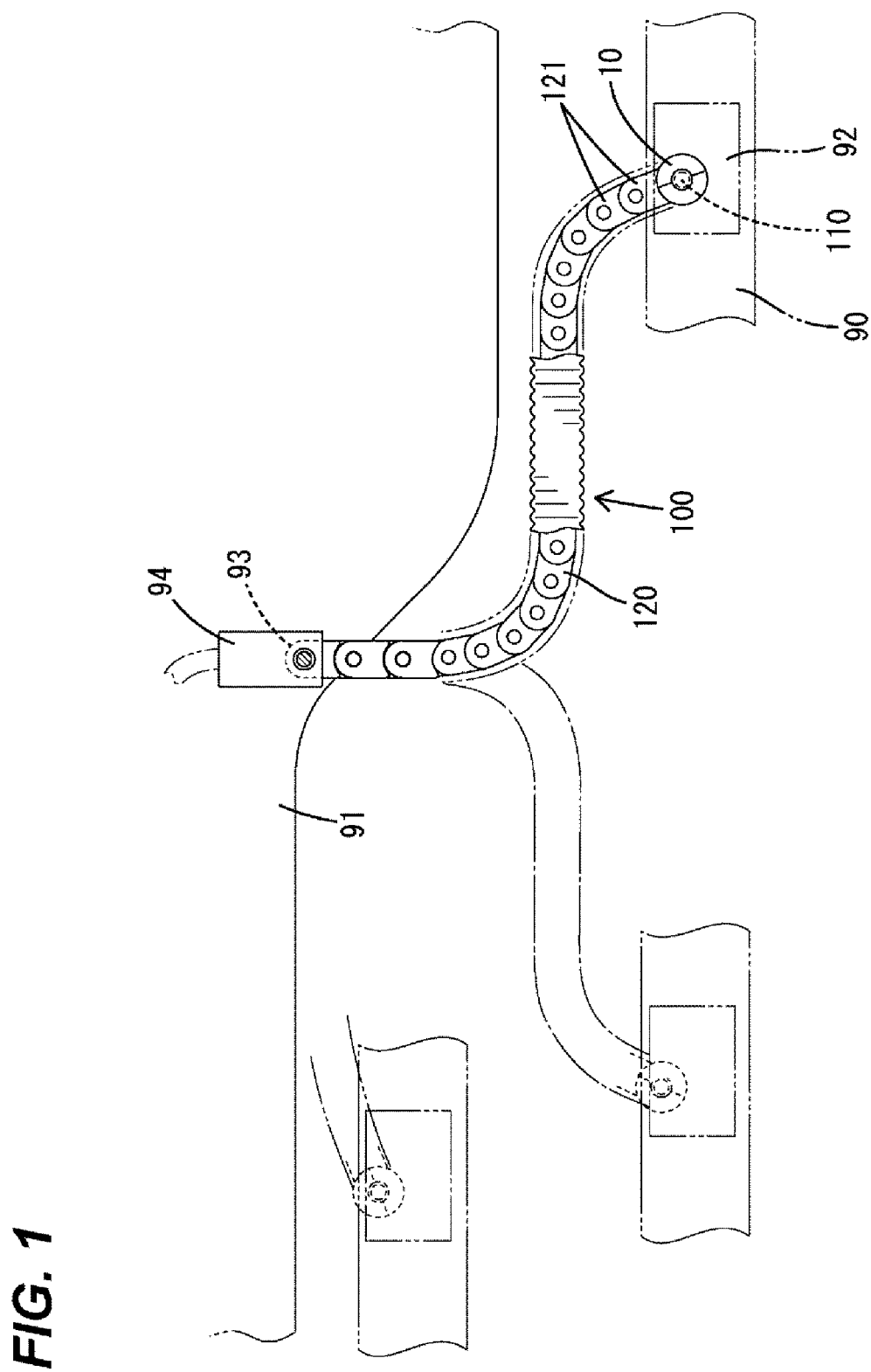
FIG. 1 is a schematic diagram illustrating a state in which a wire harness is installed in a vehicle in Embodiment 1.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF THE PRESENT DISCLOSURE

First, embodiments of the present disclosure will be listed and described.

(1) A wire guide device of the present disclosure is a wire guide device to be arranged at an end portion of a cable guide, comprising a first divided part and a second divided part that can be combined in a width direction, wherein, in a combined state, the first divided part and the second divided part form an insertion hole through which a wire passes in a direction intersecting the width direction, one end of the insertion hole is open toward the cable guide, and the other end of the insertion hole is open upward, an upper side of the insertion hole is covered by upper walls of the first divided part and the second divided part, and the upper walls of the first divided part and the second divided part are formed in the width direction, are abutted against each other, and include upper guide portions that restrict displacement in a direction orthogonal to the width direction.

With the above-mentioned configuration, the first divided part and the second divided part are guided by the upper guide portions and are then combined. Since the other end of the insertion hole is open upward, and the wire is drawn upward, providing the upper guide portions on the upper walls located on the upper side makes it possible to effectively utilize space located on the wire-drawing side and achieve excellent space efficiency. In particular, it is possible to suppress an increase in size of the wire guide device in the width direction and to improve the installability in vehicles and the like.

(2) It is preferable that a lower side of the insertion hole is covered by lower walls of the first divided part and the second divided part, and the lower walls of the first divided part and the second divided part are formed in the width direction, are abutted against each other, and include lower guide portions that restrict displacement in the direction orthogonal to the width direction.

With the above-mentioned configuration, the combining operations of the first divided part and the second divided part are also guided by the lower guide portions in addition to the upper guide portions. Since the lower guide portions are provided on the lower walls, an increase in size of the wiring guide device in the width direction can be avoided.

(3) It is preferable that the first divided part includes coupling portions that are provided on the upper wall and the lower wall and are to be pivotably coupled to a link part of the cable guide.

With the above-mentioned configuration, the link part can be coupled to only the first divided part, thus making it possible to omit, from the second dividing part, structures to be coupled to the link part. As a result, the wire guide device and the cable guide can be easily attached to each other, and the coupling portions can be formed with high accuracy.

(4) It is preferable that the first divided part and the second divided part in a combined state include a tubular portion that protrudes upward, the other end of the insertion hole is open in the tubular portion, and an upper end of the tubular portion is located at a position that is as high as positions of upper ends of the upper guide portions, or is located higher than the upper guide portions.

With the above-mentioned configuration, it is possible to prevent an increase in size of the wire guide device in the vertical direction as a whole.

(5) It is preferable that upper walls of the first divided part and the second divided part include rotating portions that are rotatably supported by a bracket, and locking portions for keeping the first divided part and the second divided part in a combined state, and the locking portions are arranged at positions that are farther away from the rotating portions than the upper guide portions are.

With the above-mentioned configuration, it is possible to suppress transfer of stress applied to the rotating portion from the bracket, to the locking portion, and therefore, the first divided part and the second divided part are less likely to be separated, thus making it possible to favorably keep the first divided part and the second divided part in the combined state.

DETAILS OF EMBODIMENT OF THE PRESENT DISCLOSURE

Hereinafter, specific embodiments of a wire guide device of the present disclosure will be described with reference to the drawings. It should be noted that the present invention is not limited to these embodiments and is defined by the scope of the appended claims, and all changes that fall within the same essential spirit as the scope of the claims are intended to be included therein.

Embodiment 1

As shown in FIG. 1, a wire guide device 10 according to Embodiment 1 is installed in a vehicle provided with a sliding door 90. A wire harness 100 for supplying electricity to electric components in the sliding door 90 is provided between the sliding door 90 and a vehicle body 91. The wire harness 100 includes a plurality of wires 110 and a flexible cable guide 120. The cable guide 120 is constituted by a plurality of link parts 121 that are coupled to each other so as to be able to pivot. A plurality of wires 110 are passed through the cable guide 120. A body-side wire guide device 93 is arranged at an end portion of the cable guide 120 that is located near the vehicle body 91. The body-side wire guide device 93 is pivotably attached to a body-side bracket 94.

Figure 3:
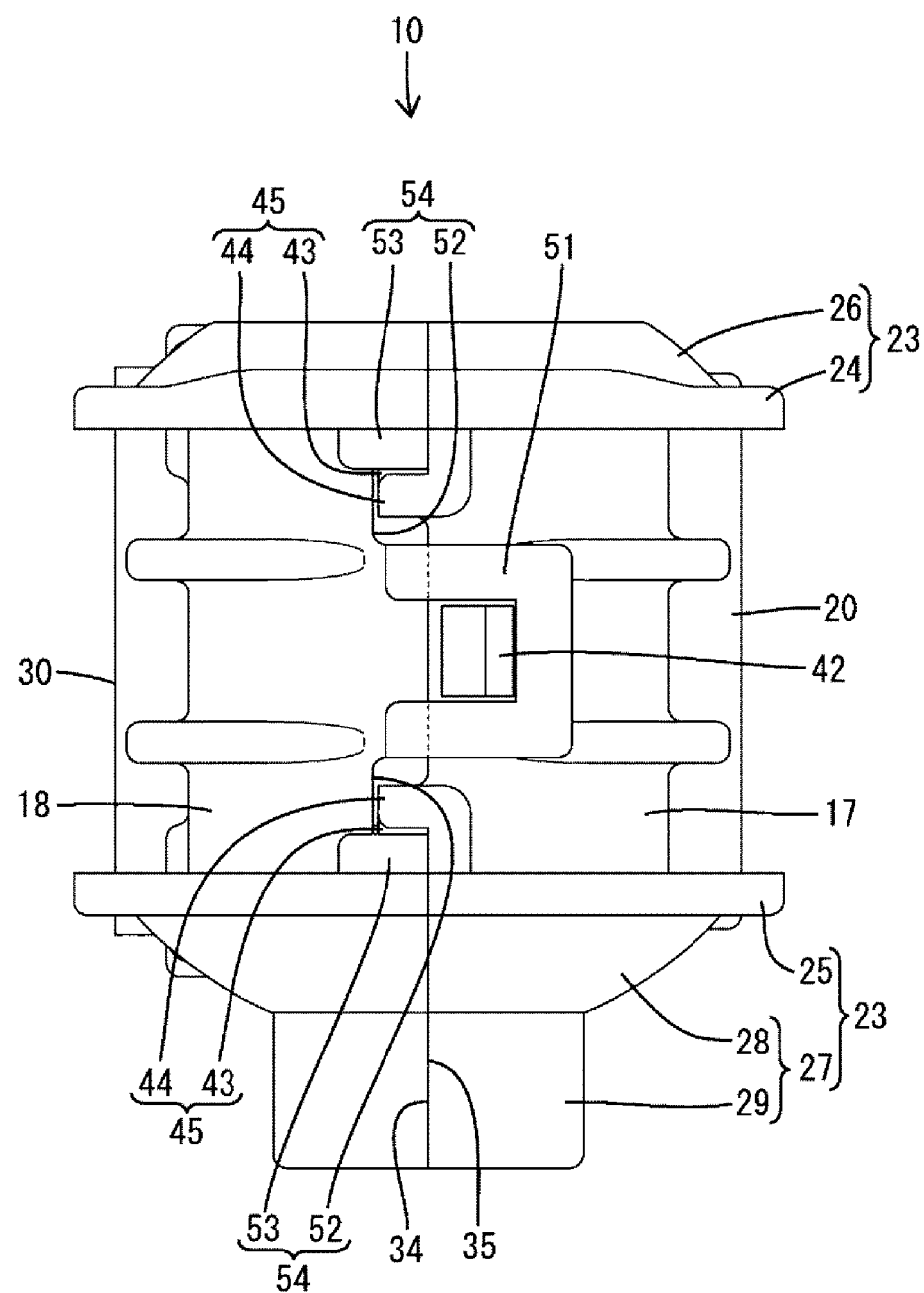
FIG. 3 is a rear view of the wire guide device.
Figure 4:
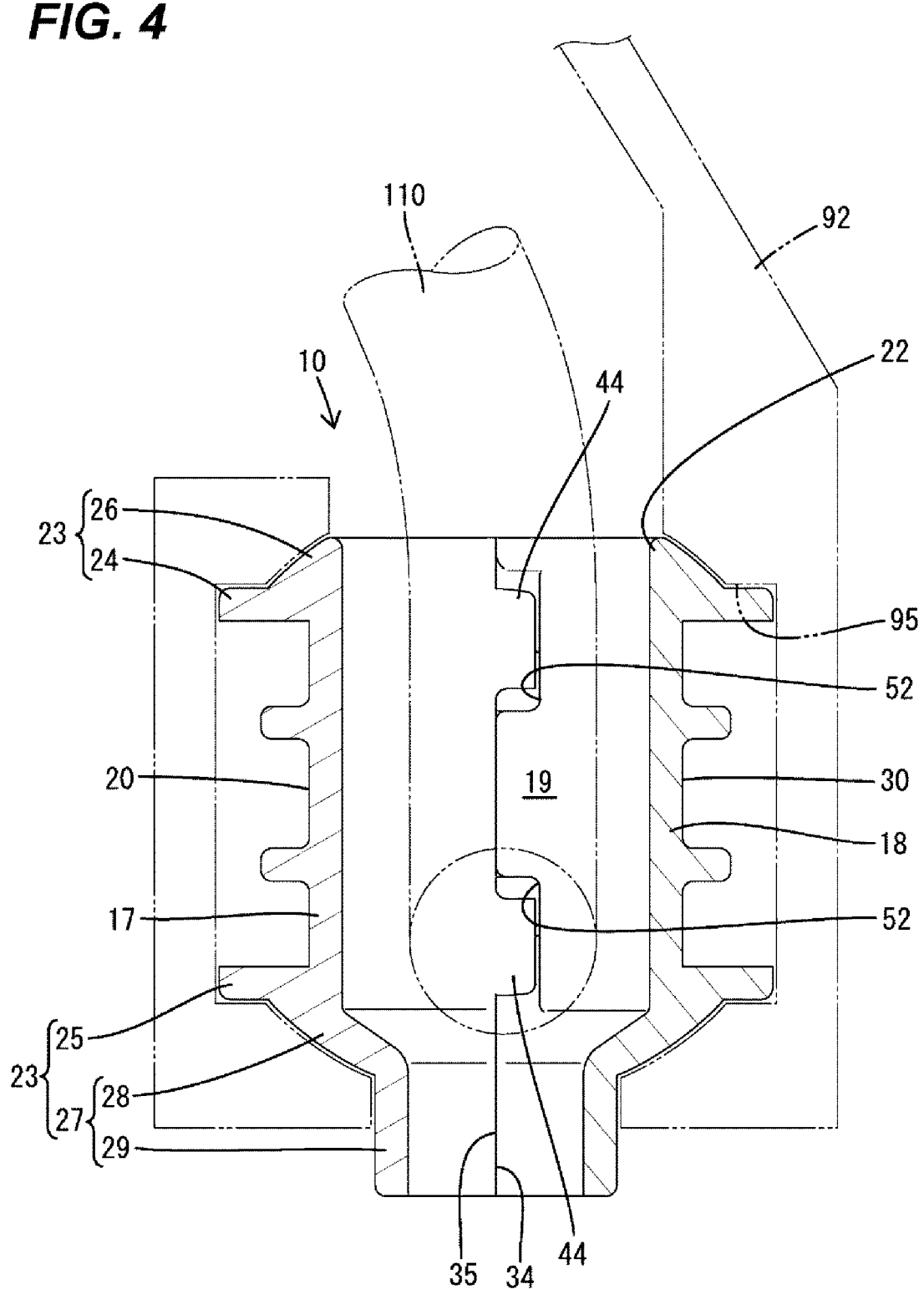
FIG. 4 is a cross-sectional view of the wire guide device taken along the rotation axis of a rotating portion.

The wire guide device 10 of Embodiment 1 is arranged at an end portion of the cable guide 120 that is located near the sliding door 90. The wire guide device 10 is rotatably attached to a door-side bracket (referred to merely as a "bracket 92" hereinafter). It should be noted that the vertical direction in the following description of the wire guide device 10 is based on the vertical direction in the diagrams excluding FIGS. 1 and 5. The horizontal direction in FIGS. 3 and 4 is taken as the width direction. Regarding the front-rear direction, the left side in FIG. 2, on which the cable guide 120 is located, is taken as the front side.

Figure 2:
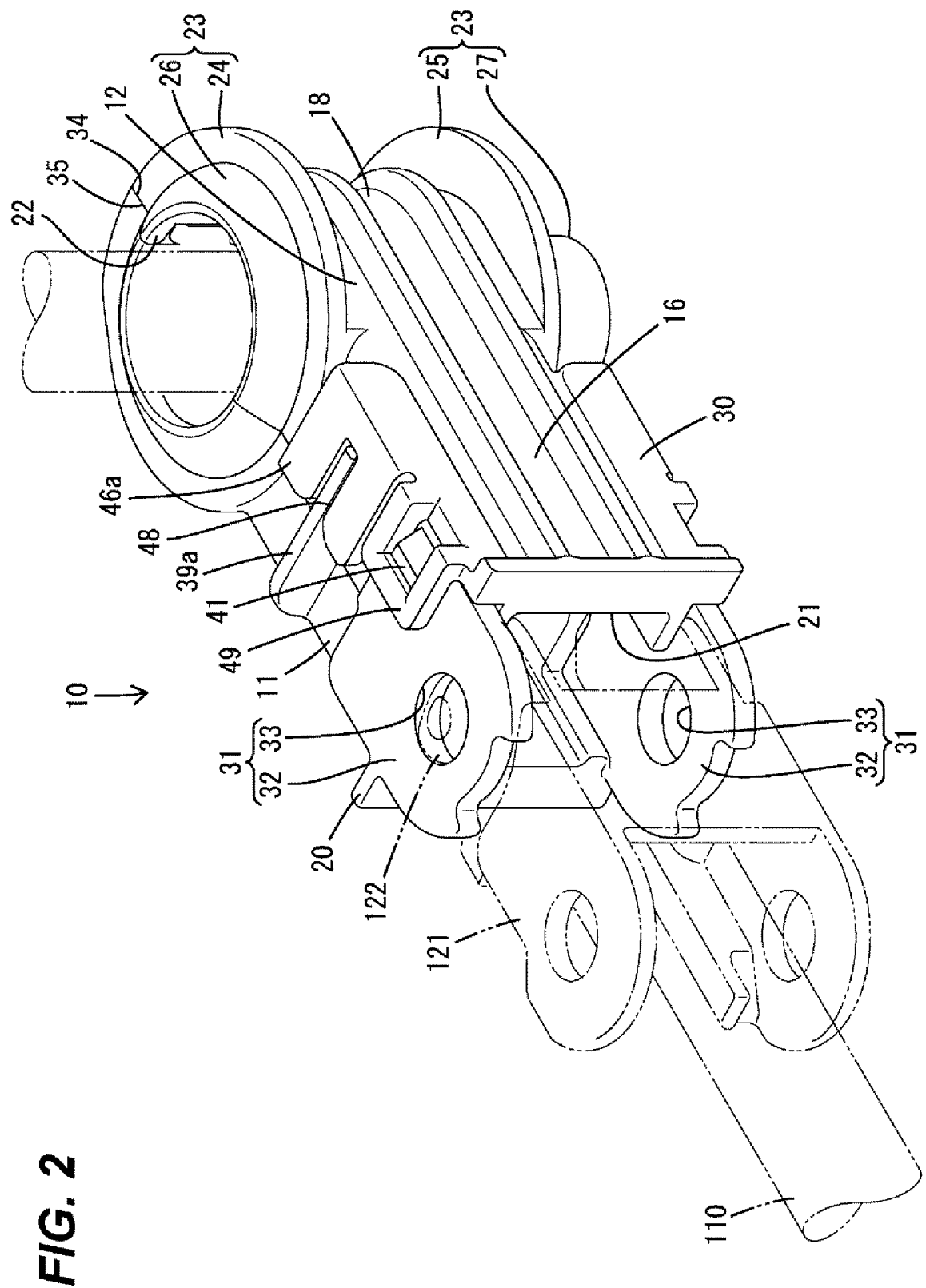
FIG. 2 is a perspective view of a wire guide device.
Figure 6:
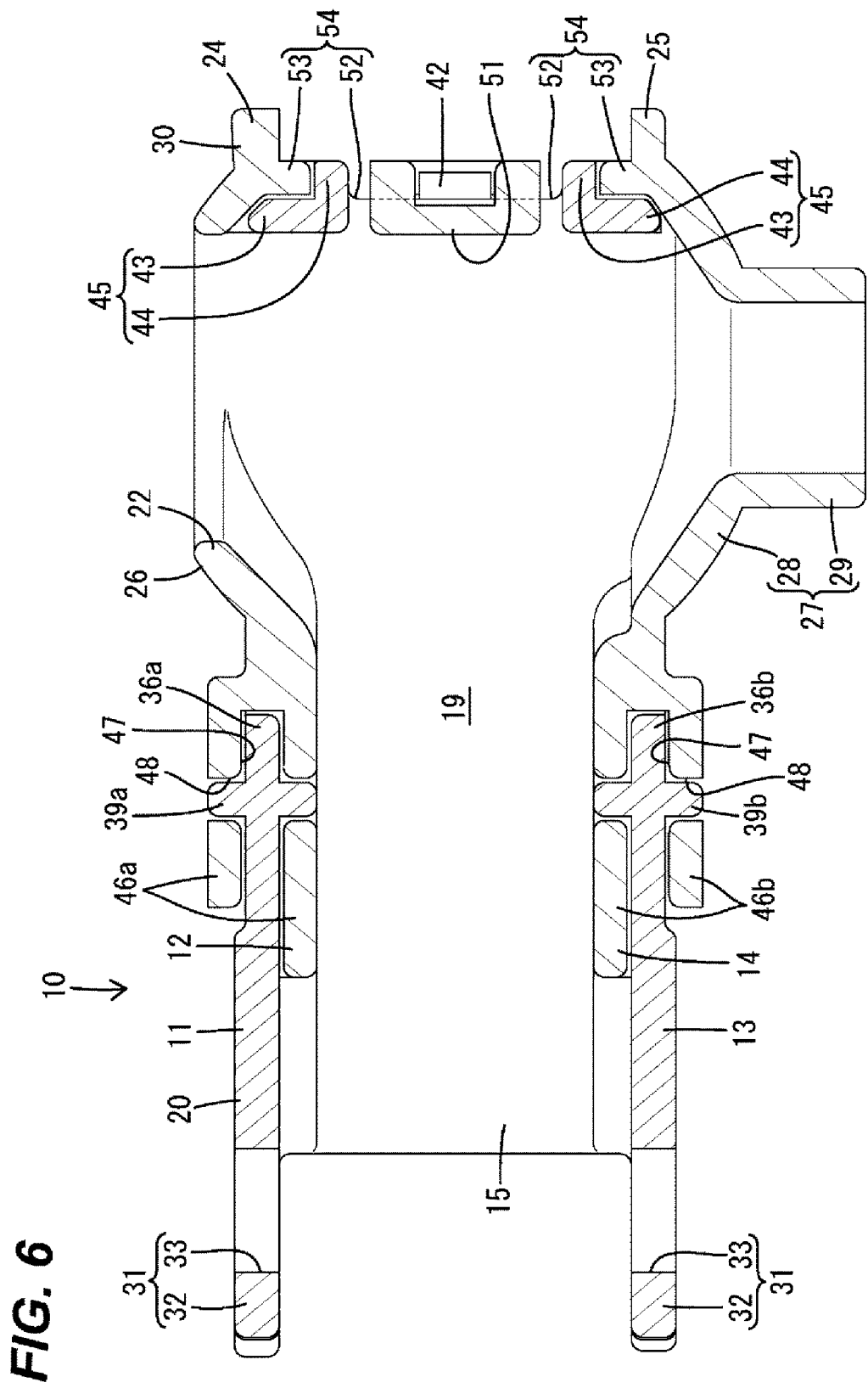
FIG. 6 is a cross-sectional view taken along line A-A in FIG. 5.

As shown in FIGS. 2 and 6, the wire guide device 10 includes upper walls 11 and 12 located on the upper side, lower walls 13 and 14 located on the lower side, two side walls 15 and 16 that are located between the two ends in the width direction of the upper walls 11 and 12 and the two ends in the width direction of the lower walls 13 and 14 and connect the upper walls 11 and 12 and the lower walls 13 and 14, and end walls 17 and 18 that are located between the rear ends of the upper walls 11 and 12 and the rear ends of the lower walls 13 and 14 and connect the upper walls 11 and 12 and the lower walls 13 and 14. The two ends in the width direction of the end walls 17 and 18 are connected to the side walls 15 and 16. An insertion hole 19 through which the wires 110 extending from the inside of the cable guide 120 are passed is provided inside the wire guide device 10. One end of the insertion hole 19 forms a front-side opening 21 that is located on the front side of the wire guide device 10 and is open toward the cable guide 120. The front-side opening 21 is located on the front side of the end walls 17 and 18. The upper walls 11 and 12, the lower walls 13 and 14, and the two side walls 15 and 16 delimit the front-side opening 21 in a rectangular shape in a front view. The other end of the insertion hole 19 forms an upper-side opening 22 that is located near the rear ends of the upper walls 11 and 12 and is open upward.

A rotating portion 23 is provided at the rear-end portion of the wire guide device 10. The rotating portion 23 includes an annular upper flange portion 24 and an annular lower flange portion 25 that protrude from the outer circumferences at the rear ends of the upper walls 11 and 12 and the lower walls 13 and 14, a tubular portion 26 that protrudes upward from the rear-end portions of the upper walls 11 and 12, and a lower tubular portion 27 that protrudes downward from the rear-end portions of the lower walls 13 and 14.

As shown in FIGS. 3 and 4, on the lower walls 13 and 14, the lower tubular portion 27 includes a base-end tubular portion 28 whose inner diameter gradually decreases downward from the inner circumference of the lower flange portion 25, and a leading-end tubular portion 29 that protrudes downward from the opening at the lower end of the base-end tubular portion 28 and has a constant inner diameter. The base-end tubular portion 28 bulges out in a curved shape at the rear-end portions of the lower walls 13 and 14.

Figure 5:
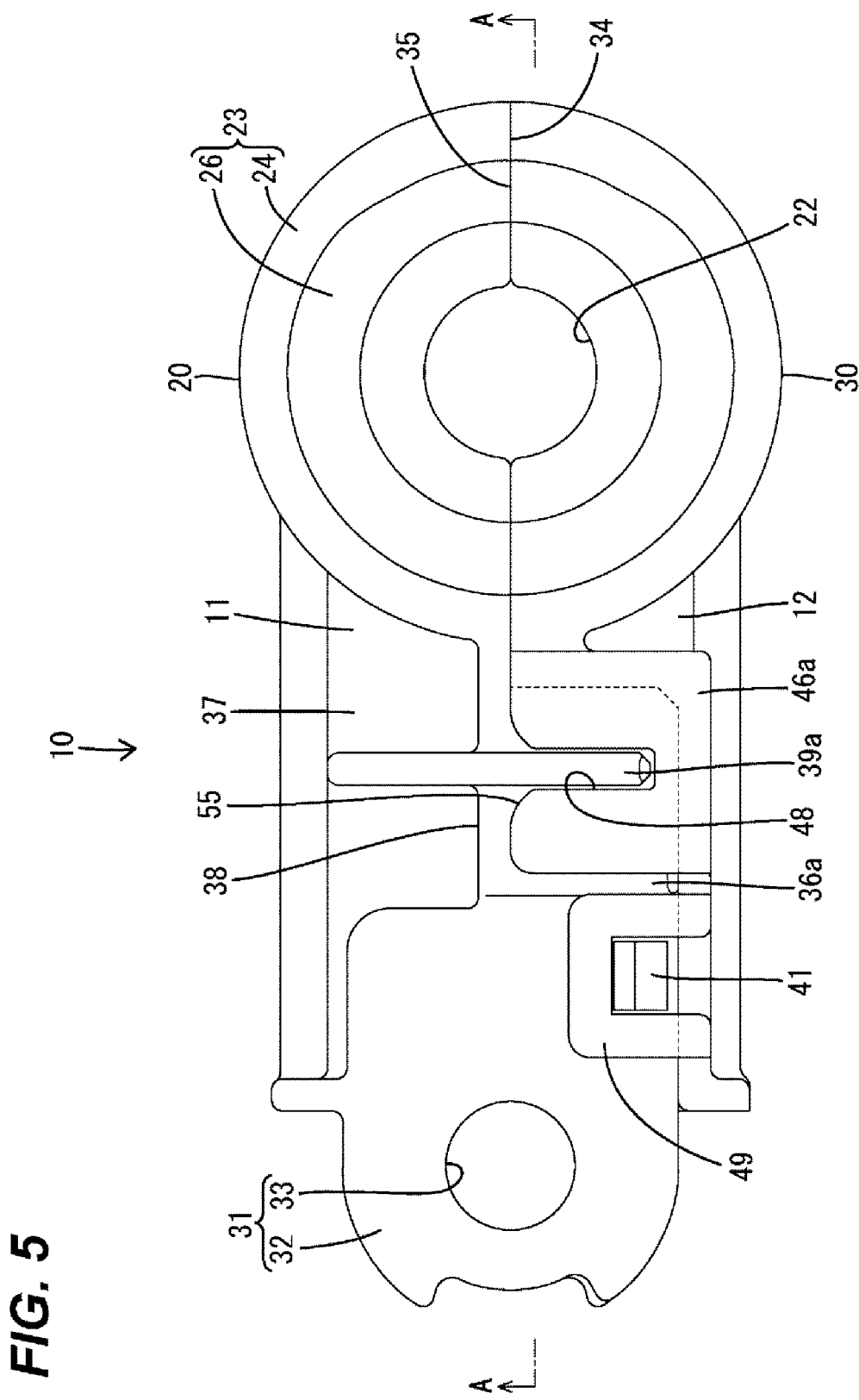
FIG. 5 is a plan view of the wire guide device.

On the upper walls 11 and 12, the tubular portion 26 has a shape whose inner diameter gradually decreases upward from the upper flange portion 24. The tubular portion 26 bulges out in a curved shape at the rear-end portions of the upper walls 11 and 12. The protrusion amount of the tubular portion 26 protruding from the upper flange portion 24 is smaller than the protrusion amount of the base-end tubular portion 28 protruding from the lower flange portion 25. The diameter of the opening at the upper end of the tubular portion 26 is larger than the inner diameter of the leading-end tubular portion 29. The upper-side opening 22 is provided in the tubular portion 26. As shown in FIG. 5, the tubular portion 26 delimits the upper-side opening 22 in a circular shape in a plan view. The end walls 17 and 18 are curved and have a circular arc shape that is concentric with the rotating portion 23. As shown in FIG. 4, the upper flange portion 24 and the lower flange portion 25 enter a fitting groove 95 of the bracket 92. The wire guide device 10 is supported by the bracket 92 so as to be capable of rotating around the vertical rotation axis that passes through the center of the rotating portion 23.

As shown in FIG. 2, two coupling portions 31 that are aligned in the vertical direction are provided at the front-end portion of the wire guide device 10. The coupling portions 31 include flat plate portions 32 that are arranged at the front-end portions of the upper wall 11 and the lower wall 13 and extend in the front-rear direction, and coupling holes 33 that pass through the flat plate portions 32 in the vertical direction (thickness direction). Coupling protrusions 122 of the link part 121 located at an end portion of the cable guide 120 are fitted into the coupling holes 33 of the coupling portions 31. The link part 121 of the cable guide 120 is supported by the wire guide device 10 so as to be capable of rotating around the vertical rotation axis that passes through the centers of the coupling holes 33.

Figure 7:
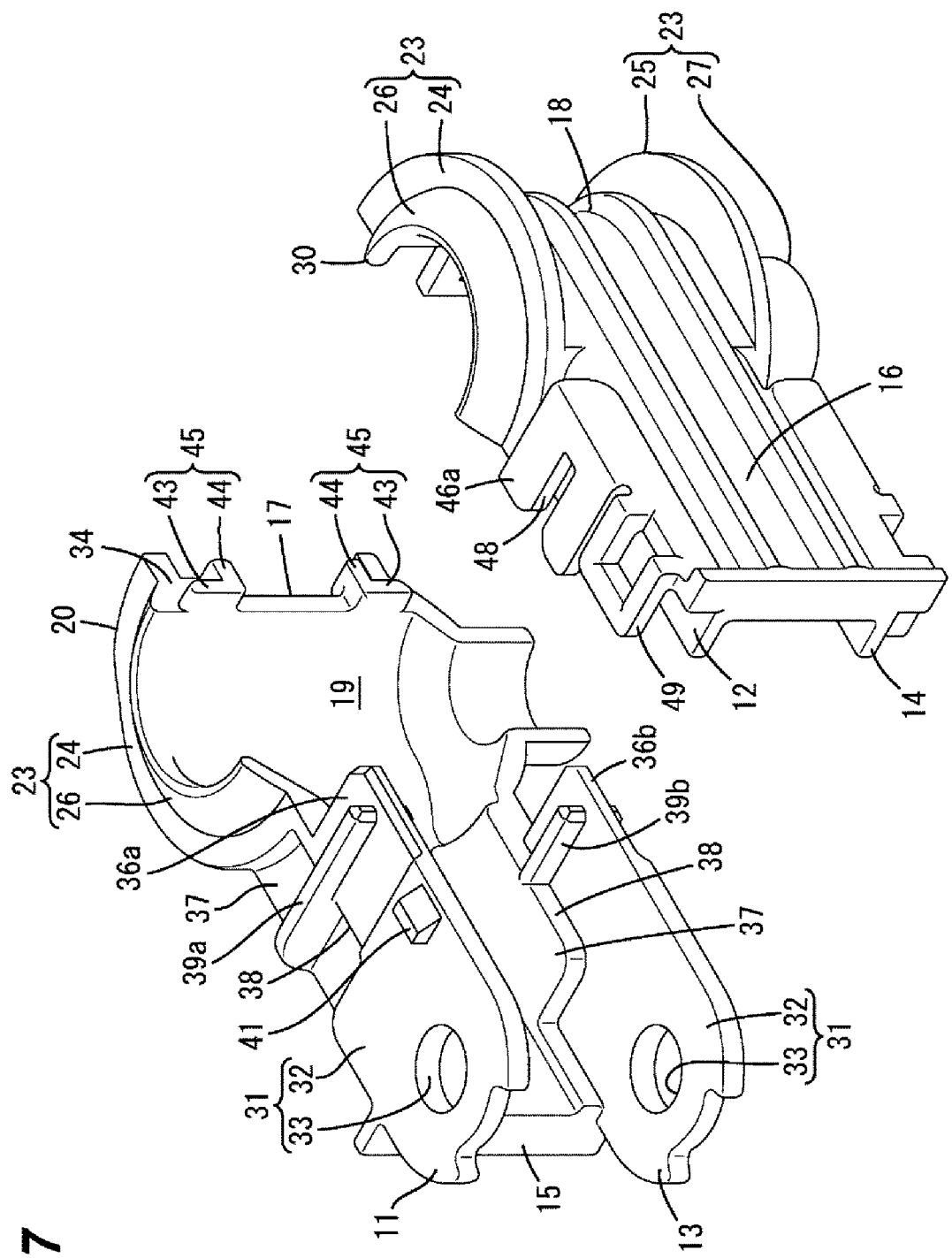
FIG. 7 is a perspective view illustrating a first divided part and a second divided part prior to being combined.

As shown in FIG. 7, the wire guide device 10 includes a first divided part 20 and a second divided part 30 that can be divided and combined in the width direction. The entire circumference of the insertion hole 19 is closed in the state in which the first divided part 20 and the second divided part 30 are combined.

The first divided part 20 includes a first upper wall portion 11 (one of the upper walls 11 and 12), a first lower wall portion 13 (one of the lower walls 13 and 14), a first side wall portion 15 (one of the two side walls 15 and 16), and a first end wall portion 17 (one of the end walls 17 and 18).

The second divided part 30 includes a second upper wall portion 12 (the other of the upper walls 11 and 12), a second lower wall portion 14 (the other of the lower walls 13 and 14), a second side wall portion 16 (the other of the two side walls 15 and 16), and a second end wall portion 18 (the other of the end walls 17 and 18).

As shown in FIGS. 2 and 3, the first divided part 20 and the second divided part 30 are opposed to each other such that division faces 34 and 35 thereof abut against each other in the combined state. The division faces 34 and 35 are formed in a direction in which the insertion hole 19 is formed (a direction from the front-side opening 21 toward the upper side opening 22). The wire guide device 10 (the first divided part 20 and the second divided part 30) is divided into two parts along the division faces 34 and 35 from top to bottom. The insertion hole 19 is divided in the width direction along the division faces 34 and 35.

As shown in FIG. 7, the divided parts of the rotating portion 23 (the divided parts of the upper flange portion 24, the lower flange portion 25, the tubular portion 26, and the lower tubular portion 27) in the first divided part 20 and the second divided part 30 have a semicircular-arc external shape. The division faces 34 and 35 of the divided parts of the rotating portion 23 are located on a plane that passes through the rotation axis and extends in the front-rear direction.

The front-end portion of the first divided part 20 is provided with the two coupling portions 31 described above. The coupling portions 31 are provided on the first upper wall portion 11 and the first lower wall portion 13. At the rear-end portion of the first divided part 20, the divided part of the rotating portion 23 is provided on one of two sides in the width direction with an axis passing through the centers of the coupling portions 31 in the width direction being at the center of the two sides, and a space is formed in a notch-like shape on the other side. As shown in FIG. 7, the first divided part 20 includes lateral pieces 36a and 36b having a flat plate shape that are located between a portion of the coupling portions 31 on the other side in the width direction and the space, in the front-rear direction, and are continuous with the flat plate portions 32 of the coupling portions 31. The rear ends of the lateral pieces 36a and 36b face the space, and are continuous with the division face 34 of the divided part of the rotating portion 23 at a right angle. The lateral piece 36a is provided on the first upper wall portion 11. The lateral piece 36b is provided on the first lower wall portion 13.

The first divided part 20 includes inner plate portions 37 at positions on the first upper wall portion 11 and the first lower wall portion 13 that are adjacent to the lateral pieces 36a and 36b in the width direction. Step portions 38 extending in the front-rear direction are formed between the inner plate portions 37 and the lateral pieces 36a and 36b, respectively. The step portions 38 are formed on the inner and outer surfaces of the first upper wall portion 11 and the first lower wall portion 13, respectively. The inner plate portions 37 are located at positions inward from the lateral pieces 36a and 36b and the flat plate portions 32 via the step portions 38, by an amount that corresponds to the step portions 38.

Figure 8:
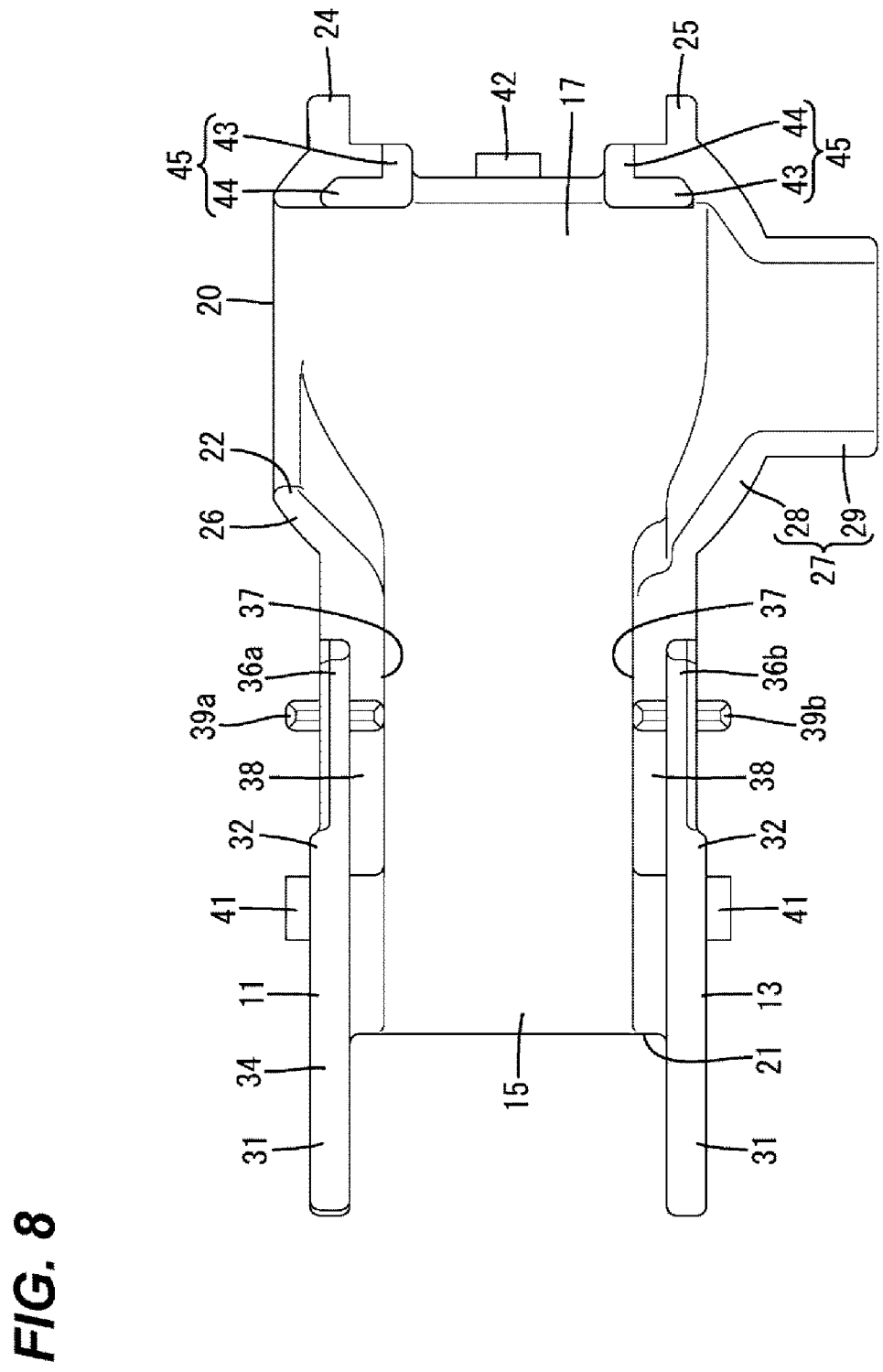
FIG. 8 is a side view of a first divided part as viewed from a division face side.

The first divided part 20 includes vertical pieces 39a and 39b extending in the width direction that are provided on the inner and outer surfaces of the lateral pieces 36a and 36b in the first upper wall portion 11 and the first lower wall portion 13. The vertical piece 39a is provided on the first upper wall portion 11. The vertical piece 39b is provided on the first lower wall portion 13. The outer vertical pieces 39a and 39b have a rib-like shape that are elongated in the width direction from the lateral pieces 36a and 36b to the inner plate portions 37. As shown in FIG. 8, the protrusion amount of the outer vertical piece 39a provided on the first upper wall portion 11 is smaller than that of the tubular portion 26, and the upper end thereof is located below the upper end of the tubular portion 26. As shown in FIG. 7, the inner vertical pieces 39a and 39b have a rib-like shape that extends in the width direction from the lateral pieces 36a and 36b to the step portions 38. The inner vertical pieces 39a and 39b are flush and continuous with the inner surfaces of the inner plate portions 37 via the step portions 38. The vertical pieces 39a and 39b and the lateral pieces 36a and 36b intersect in a cross shape in a side view.

The lateral piece 36a of the first upper wall portion 11 serves as a portion of upper guide portions 36a, 39a and 46a and a portion of vertical movement restriction portions 36a, 36b, 45, 46a, 46b, and 54. The lateral piece 36b of the first lower wall portion 13 serves as a portion of lower guide portions 36b, 39b and 46b and a portion of the vertical movement restriction portions 36a, 36b, 45, 46a, 46b, and 54. The vertical piece 39a of the first upper wall portion 11 serves as a portion of the upper guide portions 36a, 39a, and 46a and a portion of slide restriction portions 39a, 39b, 46a, and 46b. The vertical piece 39b of the first lower wall portion 13 serves as a portion of the lower guide portions 36b, 39b, and 46b and a portion of the slide restriction portions 39a, 39b, 46a, and 46b. The upper guide portions 36a, 39a, and 46a guide the combining operations of the first divided part 20 and the second divided part 30 on the upper side of the wire guide device 10. The lower guide portions 36b, 39b, and 46b guide the combining operations of the first divided part 20 and the second divided part 30 on the lower side of the wire guide device 10. The vertical movement restriction portions 36a, 36b, 45, 46a, 46b, and 54 restrict the positional shift of the first divided part 20 and the second divided part 30 in the vertical direction while they are combined. The slide restriction portions 39a, 39b, 46a, and 46b restrict the positional shift of the first divided part 20 and the second divided part 30 in the front-rear direction while they are combined.

As shown in FIG. 8, the first divided part 20 includes front-side locking protrusions 41 having a hook-like shape that are provided on the outer surfaces of the flat plate portions 32 of the coupling portions 31 in the first upper wall portion 11 and the first lower wall portion 13. The front-side locking protrusions 41 are arranged at positions close to the lateral pieces 36a and 36b, on the flat plate portions 32. In addition, the first divided part 20 includes a rear-side locking protrusion 42 having a hook-like shape that is provided on the outer surface of the first end wall portion 17. The rear-side locking protrusion 42 is arranged at a position that is located at the center in the vertical direction of the rear-end outer surface of the first end wall portion 17 as well as near the division face 34.

The first divided part 20 includes two first rear-side restriction portions 45 that are provided at positions close to the two ends in the vertical direction of the rear-end outer surface of the first end wall portion 17. As shown in FIG. 3, each of the first rear-side restriction portions 45 includes a portion that laterally protrudes (toward the second divided part 30) across the division face 34 of the first end wall portion 17. Each first rear-side restriction portion 45 includes a protruding piece 43 having a rectangular shape in a rear view, and a fitting receiving portion 44 that has an L-shape in a rear view and protrudes from the outer surface of the protruding piece 43 in a rib-like shape. The first rear-side restriction portions 45 are arranged at an upper position and a lower position that are located below the upper flange portion 24 and above the lower flange portion 25 and between which the rear-side locking protrusion 42 is located.

The second divided part 30 does not include the coupling portions 31 described above. As shown in FIG. 7, the second upper wall portion 12 and the second lower wall portion 14 do not include the coupling portions 31, and thus are smaller in size in the width direction and the front-rear direction than the first upper wall portion 11 and the first lower wall portion 13.

Figure 9:
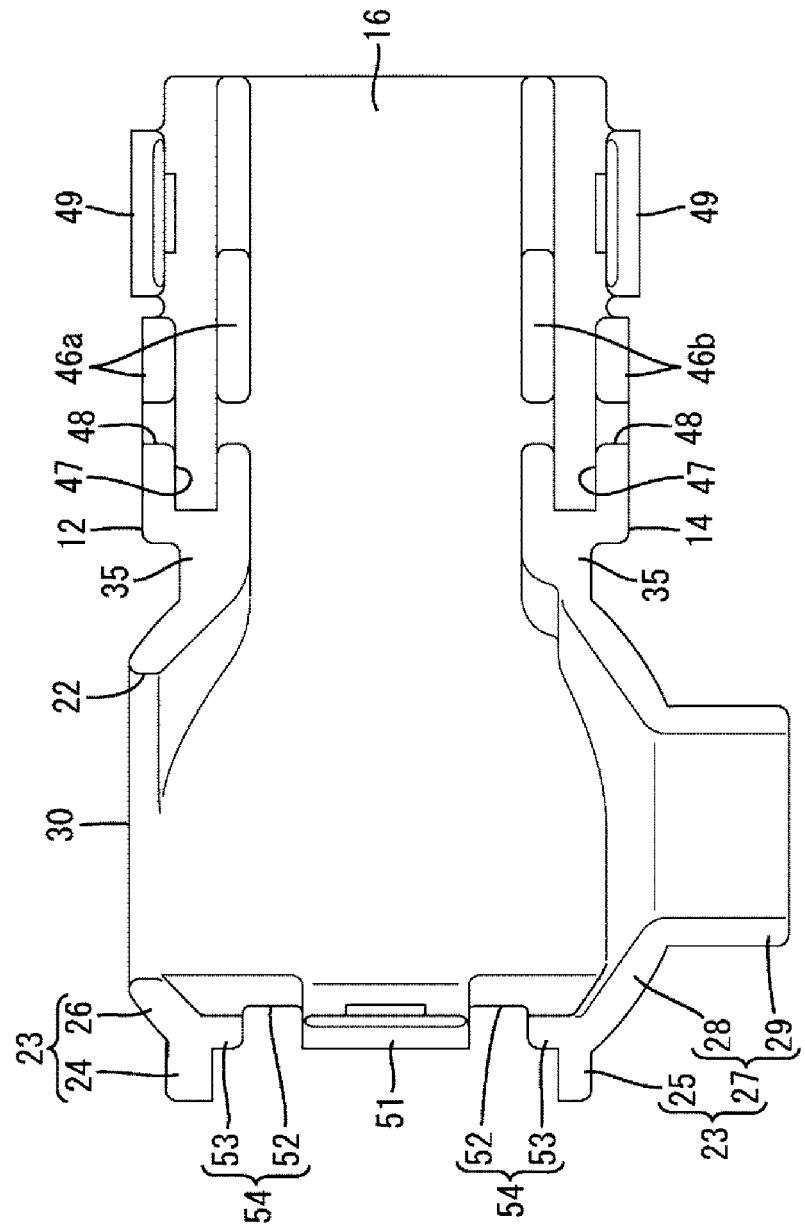
FIG. 9 is a side view of a second divided part as viewed from a division face side.

As shown in FIG. 9, the second divided part 30 includes two opposed walls 46a and two opposed walls 46b that are provided at positions located on the front side of the divided part of the rotating portion 23 in the second upper wall portion 12 and the second lower wall portion 14. The opposed walls 46a are provided on the second upper wall portion 12. The opposed walls 46b are provided on the second lower wall portion 14. The opposed walls 46a and 46b have a flat plate shape extending in the front-rear direction and are arranged parallel with one another. Excluding the divided part of the rotating portion 23, the second upper wall portion 12 and the second lower wall portion 14 have a double-wall structure due to the opposed walls 46a and 46b. The opposed walls 46a and 46b include the division faces 35 that extend in the front-rear direction and are continuous with the divided part of the rotating portion 23.

The second divided part 30 includes lateral grooves 47 that are open in the division faces 35 and are respectively located between the opposed walls 46a and between the opposed walls 46b in the second upper wall portion 12 and the second lower wall portion 14. The lateral grooves 47 are slit grooves extending in the front-rear direction and are open forward, and the rear ends thereof are closed by the divided part of the rotating portion 23.

The second divided part 30 includes vertical grooves 48 that pass through the opposed walls 46a and 46b in the vertical direction (thickness direction) in the second upper wall portion 12 and the second lower wall portion 14. The vertical groove 48 and the lateral groove 47 intersect at a right angle and are in communication with each other. The vertical grooves 48 extend in the width direction in the opposed walls 46a and 46b, and are open in the division faces 35. The vertical grooves 48 include introduction portions 55 whose widths increase toward the open ends. The introduction portions 55 expand in a curved shape (funnel shape) toward the division faces 35. The opposed walls 46a of the second upper wall portion 12 serve as portions of the upper guide portions 36a, 39a, and 46a and portions of the vertical movement restriction portions 36a, 36b, 45, 46a, 46b, and 54. The opposed walls 46b of the second lower wall portion 14 serve as portions of the upper guide portions 36b, 39b, and 46b and portions of the vertical movement restriction portions 36a, 36b, 45, 46a, 46b, and 54.

The second divided part 30 includes front-side locking pieces 49 that are provided on the front portions of the outer opposed walls 46a and 46b in the second upper wall portion 12 and the second lower wall portion 14. As shown in FIGS. 2 and 5, the front-side locking pieces 49 have a rectangular frame shape and laterally protrude (toward the first divided part 20) from end portions close to the second side wall portion 16. The front-side locking pieces 49 are arranged at positions close to the front end of the second divided part 30. The front-side locking pieces 49 are capable of undergoing flexural deformation in the vertical direction (interior-exterior direction) about the end portions close to the second side wall portion 16. The front-side locking protrusions 41 of the first divided part 20 are fitted into the front-side locking pieces 49.

As shown in FIG. 3, the second divided part 30 includes a rear-side locking piece 51 that is provided on the outer surface of the second end wall portion 18. The rear-side locking piece 51 has a rectangular frame shape and laterally protrudes (toward the first divided part 20) across the division face 35 of the second end wall portion 18. The rear-side locking piece 51 is arranged at a position that is located at the center in the vertical direction of the rear-end outer surface of the second end wall portion 18. The rear-side locking piece 51 is capable of undergoing flexural deformation in the front-rear direction (interior-exterior direction) about the end portion close to the division face 35 on the rear-end outer surface of the second end wall portion 18. The rear-side locking protrusion 42 of the first divided part 20 is fitted into the rear-side locking piece 51.

The rear-side locking piece 51, the rear-side locking protrusion 42, the front-side locking pieces 49, and the front-side locking protrusions 41 together serve as locking portions 41, 42, 49, and 51 for keeping the first divided part 20 and the second divided part 30 in the combined state.

The second divided part 30 includes two second rear-side restriction portions 54 that are provided at positions close to the two ends in the vertical direction of the rear-end outer surface of the second end wall portion 18. As shown in FIG. 3, the second rear-side restriction portions 54 include recessed portions 52 that have a rectangular shape in a rear view and are open in the division face 35 of the second end wall portion 18, and fitting protruding portions 53 that have a rectangular shape in a rear view and protrude from positions on the outer surface of the second wall portion 18 that are located above and below the recessed portions 52 to form a rib-like shape. The upper and lower edge of the rear-side locking piece 51 face the upper and lower recessed portions 52. The upper fitting protruding portion 53 is integrally coupled to the upper flange portion 24. The lower fitting protruding portion 53 is integrally coupled to the lower flange portion 25.

As shown in FIG. 6, in the state in which the first divided part 20 and the second divided part 30 are combined, portions of the fitting receiving portions 44 enter the recessed portions 52, the fitting protruding portions 53 are fitted into the fitting receiving portions 44, and the protruding pieces 43 are arranged opposed to the insides (front surfaces) of the fitting protruding portions 53. The first rear-side restriction portions 45 and the second rear-side restriction portions 54 serve as portions of the vertical movement restriction portions 36a, 36b, 45, 46a, 46b, and 54.

The following will describe an example of an operation for assembling the wire harness 100, and the functions of the wire guide device 10.

In the state in which the first divided part 20 and the second divided part 30 are separated from each other, the wires 110 extending from the inside of the cable guide 120 are placed along the inner surface side of the first side wall portion 15 of the first divided part 20. In the first divided part 20, the wires 110 are arranged extending from the front-side opening 21 of the first divided part 20 to the upper-side opening 22 thereof. Furthermore, the wires 110 are drawn upward through the upper-side opening 22.

The wires 110 are placed along the first divided part 20, and the link part 121 located at an end portion of the cable guide 120 is coupled to the coupling portions 31 of the first divided part 20. As a result, the first divided part 20 is held at an end portion of the cable guide 120 before the first divided part 20 and the second divided part 30 are combined.

Subsequently, the second divided part 30 is combined with the first divided part 20 laterally (in the width direction). In the process of combining the first divided part 20 and the second divided part 30, the first upper wall portion 11 and the second upper wall portion 12 overlap each other in the vertical direction, and the first lower wall portion 13 and the second lower wall portion 14 overlap each other in the vertical direction (see FIG. 6). At this time, the lateral pieces 36a and 36b enter the lateral grooves 47, and vertical pieces 39a and 39b enter the vertical grooves 48. The vertical pieces 39a and 39b are introduced into the introduction portions 55 and smoothly fitted into the vertical grooves 48. The vertical displacement of the first divided part 20 and the second divided part 30 is restricted due to the lateral pieces 36a and 36b coming into (sliding) contact with the upper and lower surfaces of the lateral grooves 47 in the vertical direction. The front-rear displacement of the first divided part 20 and the second divided part 30 is restricted due to the vertical pieces 39a and 39b coming into contact with the front and rear surfaces of the vertical grooves 48 in the front-rear direction. Accordingly, the first divided part 20 and the second divided part 30 are allowed to move only in the width direction, and the combining operation in the width direction is smoothly guided.

In the process of combining the first divided part 20 and the second divided part 30, the front-side locking pieces 49 come into contact with the front-side locking protrusions 41 and undergo outward flexural deformation, and the rear-side locking piece 51 comes into contact with the rear-side locking protrusion 42 and undergoes outward flexural deformation. When the first divided part 20 and the second divided part 30 reach the positions where their division faces 34 and 35 come into contact, the front-side locking pieces 49 and the rear-side locking piece 51 are elastically restored, and the front-side locking protrusions 41 and the rear-side locking protrusion 42 are fitted into the front-side locking pieces 49 and the rear-side locking piece 51. As a result, the first divided part 20 and the second divided part 30 are kept in a combined state.

In the state in which the first divided part 20 and the second divided part 30 are combined, the vertical pieces 39a and 39b are entirely accommodated in the vertical grooves 48, and the end surfaces of the vertical pieces 39a and 39b are flush with the inner and outer surfaces of the opposed walls 46a and 46b. The division faces 35 of the inner opposed walls 46a and 46b are opposed to the step portions 38, and the inner surfaces of the inner opposed walls 46a and 46b are flush with the inner surfaces of the inner plate portions 37. Accordingly, the inner surfaces of the first divided part 20 are continuous with the inner surfaces of the second divided part 30, and no steps are formed. As a result, it is possible to prevent the wires 110 inserted through the insertion hole 19 from being damaged due to interference with the steps.

When the cable guide 120 is bent or an external force is applied to the cable guide 120 from above due to the sliding door 90 being opened or closed in the state in which the first divided part 20 and the second divided part 30 are combined, torsional force is generated between the cable guide 120 and the wire guide device 10. If the torsional force is excessively large, there is a concern that the positions of the division faces 34 and 35 will shift, and locking between the front-side locking pieces 49 and the front-side locking protrusions 41 and locking between the rear-side locking piece 51 and the rear-side locking protrusion 42 will be released, and thus the first divided part 20 and the second divided part 30 will be separated from each other.

In that respect, in the case of Embodiment 1, the first rear-side restriction portions 45 and the second rear-side restriction portion 54 are fitted to each other in a recess-projection manner and are engaged with each other in the vertical direction, and in addition, the lateral pieces 36a and 36b abut against the opposed walls 46a and 46b in the vertical direction in the lateral grooves 47 (see FIGS. 3 and 6). This makes it possible to prevent a vertical positional shift of the division faces 34 and 35 of the first divided part 20 and the second divided part 30. Moreover, the vertical pieces 39a and 39b abut against the opposed walls 46a and 46b in the front-rear direction in the vertical grooves 48, thus making it possible to prevent a front-rear positional shift of the division faces 34 and 35. Therefore, the positional shift of the division faces 34 and 35 can be prevented even when an excessively large torsional force is applied to the first divided part 20 and the second divided part 30 in the combined state.

As described above, with Embodiment 1, the restriction portions 36a, 36b, 39a, 39b, 45, 46a, 46b, and 54, which are provided separately from the locking portions 41, 42, 49 and 51 and include the vertical movement restriction portions 36a, 36b, 45, 46a, 46b, and 54 and the slide restriction portions 39a, 39b, 46a, and 46b, restrict the positional shift of the division faces 34 and 35 of the first divided part 20 and the second divided part 30 even when an external force such as torsional force is applied to the first divided part 20 and the second divided part 30 in the combined state. Accordingly, the first divided part 20 and the second divided part 30 are stably kept in the combined state.

Since the vertical movement restriction portions 36a, 36b, 46a, and 46b are provided along the wall surfaces of the upper walls 11 and 12 and the lower walls 13 and 14, the sizes of the lateral grooves 47, the lateral pieces 36a and 36b, and the like in the front-rear direction can be increased, thus making it possible to reliably prevent positional shift of the first divided part 20 and the second divided part 30 in the vertical direction.

Since the vertical movement restriction portions 45 and 54 are also provided on the end walls 17 and 18, it is possible to keep a foreign object (including a foot or the like) from coming in contact with the vertical movement restriction portions 45 and 54 when an external force caused by interference by a foreign object is applied to the cable guide 120 side.

Moreover, the vertical movement restriction portions 36a, 36b, 46a, and 46b and the slide restriction portions 39a, 39b, 46a, and 46b intersect and thus occupy small areas on the upper walls 11 and 12 and the lower walls 13 and 14, which can contribute to the reduction in the size of the wire guide device 10. In particular, the vertical movement restriction portions 36a, 36b, 46a, and 46b include the lateral pieces 36a and 36b provided on the first divided part 20, and the lateral grooves 47 that are provided on the second divided part 30 and to which the lateral pieces 36a and 36b are to be fitted, and the slide restriction portions 39a, 39b, 46a, and 46b include the vertical pieces 39a and 39b that are provided on the first divided part 20 and intersect the lateral pieces 36a and 36b, and the vertical grooves 48 that are provided in the second divided part 30 and intersect the lateral grooves 47 and to which the vertical pieces 39a and 39b are fitted, and therefore, the vertical movement restriction portions 36a, 36b, 46a, and 46b and the slide restriction portions 39a, 39b, 46a, and 46b do not have complicated structures.

In the case of Embodiment 1, the front-side locking pieces 49 (portions of the locking portion) are located at positions on the second upper wall portion 12 and the second lower wall portion 14 that are farther away from the rotating portion 23 than the positions of the lateral pieces 36a and 36b (portions of the upper guide portions 36a, 39a, and 46a) are. This makes it possible to suppress transfer of stress applied to the rotating portion 23 from the bracket 92, to the front-side locking pieces 49. Therefore, it is possible to favorably keep a state in which the front-side locking pieces 49 are locked to the front side locking protrusions 41 and thus prevent the first divided part 20 and the second divided part 30 from being unintentionally released (separated).

Furthermore, with Embodiment 1, excellent space efficiency is achieved since the upper-side opening 22 of the insertion hole 19 is open in the upper surface of the wire guide device 10, the wires 110 are drawn upward, and the upper guide portions 36a, 39a, and 46a are provided on the upper walls 11 and 12 through which the wires 110 are drawn. In particular, an increase in size in the width direction in which the wire guide device 10 pivots can be suppressed, thus making it possible to improve the installability in vehicles and the like and to facilitate application to the layout. In addition, since the upper ends of the tubular portions 26 are located higher than the upper end of the vertical piece 39a, the size in the vertical direction of the entire wire guide device 10 is not increased.

Furthermore, the lower guide portions 36b, 39b, and 46b are also provided in addition to the upper guide portions 36a, 39a, and 46a, and therefore, the combining operations of the first divided part 20 and the second divided part 30 are more stably guided.

Moreover, since the first divided part 20 includes the coupling portions 31 to which the link part 121 located at an end portion of the cable guide 120 is to be pivotably coupled, the wire guide device 10 and the cable guide 120 can be attached to each other by coupling the link part 121 to the first divided part 20, and thus the burden of performing the attachment operation can be reduced.

Other Embodiments of the Present Disclosure

The embodiments disclosed herein are exemplary in all respects, and should be construed as being not limitative.

Although the wire guide device is installed at an end portion on the sliding door side of the cable guide in Embodiment 1 above, the wire guide device may be installed at an end portion on the vehicle body side of the cable guide in other embodiments.

Although the wire guide device is provided in a wire harness for a sliding door in Embodiment 1 above, the wire guide device can be provided in various wire harnesses including a cable guide in other embodiments.

Although the vertical movement restriction portions are provided on the upper wall, the lower wall, and the end wall in Embodiment 1 above, it is sufficient that the vertical movement restriction portions are provided on any one or two of the upper wall, the lower wall, and the end wall in other embodiments.

Although the slide restriction portions are provided on the upper wall and the lower wall in Embodiment 1 above, the slide restriction portion may be provided on one of the upper wall and the lower wall in other embodiments.

Although the upper end of the tubular portion is located above the upper ends of the upper guide portions in Embodiment 1 above, the upper end of the tubular portion may be as high as the upper ends of the upper guide portions in other embodiments.

Although the restriction portion includes the vertical movement restriction portion and the slide restriction portion in Embodiment 1 above, it is sufficient that the restriction portion includes one of the vertical movement restriction portion and the slide restriction portion in other embodiments.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A wire guide device to be arranged at an end portion of a cable guide, comprising
   a first divided part and a second divided part that can be combined in a width direction,
   wherein, in a combined state, the first divided part and the second divided part form an insertion hole through which a wire passes in a direction intersecting the width direction,
   one end of the insertion hole is open toward the cable guide, and the other end of the insertion hole is open upward,
   an upper side of the insertion hole is covered by upper walls of the first divided part and the second divided part, and
   the upper walls of the first divided part and the second divided part are formed in the width direction, are abutted against each other, and include upper guide portions that restrict displacement in a direction orthogonal to the width direction.

2. The wire guide device according to claim 1,
   wherein a lower side of the insertion hole is covered by lower walls of the first divided part and the second divided part, and
   the lower walls of the first divided part and the second divided part are formed in the width direction, are abutted against each other, and include lower guide portions that restrict displacement in the direction orthogonal to the width direction.

3. The wire guide device according to claim 2, wherein the first divided part includes coupling portions that are provided on the upper wall and the lower wall and are to be pivotably coupled to a link part of the cable guide.

4. The wire guide device according to claim 1, wherein the first divided part and the second divided part in a combined state include a tubular portion that protrudes upward, the other end of the insertion hole is open in the tubular portion, and an upper end of the tubular portion is located at a position that is as high as positions of upper ends of the upper guide portions, or is located higher than the upper guide portions.

5. The wire guide device according to claim 1,
   wherein upper walls of the first divided part and the second divided part include rotating portions that are rotatably supported by a bracket, and locking portions for keeping the first divided part and the second divided part in a combined state, and
   the locking portions are arranged at positions that are farther away from the rotating portions than the upper guide portions are.

* * * * *